US009766753B2

(12) United States Patent
Su et al.

(10) Patent No.: US 9,766,753 B2
(45) Date of Patent: Sep. 19, 2017

(54) OPTICAL TOUCH SYSTEM AND METHOD HAVING IMAGE SENSORS TO DETECT OBJECTS OVER A TOUCH SURFACE

(71) Applicant: PIXART IMAGING INC., Hsin-Chu (TW)

(72) Inventors: Tzung Min Su, Hsinchu (TW); Ming Tsan Kao, Hsinchu (TW); Chun-Sheng Lin, Hsinchu (TW); Chih Hsin Lin, Hsinchu (TW); Yi Hsien Ko, Hsinchu (TW)

(73) Assignee: Pixart Imaging Inc., Hsin-Chu (TW)

( * ) Notice: Subject to any disclaimer, the term of this patent is extended or adjusted under 35 U.S.C. 154(b) by 273 days.

(21) Appl. No.: 13/841,385

(22) Filed: Mar. 15, 2013

(65) Prior Publication Data
US 2014/0035879 A1 Feb. 6, 2014

(30) Foreign Application Priority Data

Aug. 3, 2012 (TW) .............................. 101127934 A

(51) Int. Cl.
G06F 3/042 (2006.01)
G06F 3/041 (2006.01)

(52) U.S. Cl.
CPC ............ *G06F 3/042* (2013.01); *G06F 3/0416* (2013.01); *G06F 3/0428* (2013.01); *G06F 2203/04104* (2013.01)

(58) Field of Classification Search
CPC ...... G06F 3/042; G06F 3/0416; G06F 3/0428; G06F 2203/04104

(Continued)

(56) References Cited

U.S. PATENT DOCUMENTS 8,957,864 B2 * 2/2015 Sato .............................. 345/173
2009/0322708 A1 * 12/2009 Xuan ..................... G06F 3/0418
345/175

(Continued)

FOREIGN PATENT DOCUMENTS

CN  101834991 A  9/2010
CN  201611477 U  10/2010

(Continued)

OTHER PUBLICATIONS

Office Action from Republic of China Intellectual Property Office in the corresponding Taiwan application 101127934 dated Sep. 24, 2014, 7 pp., with partial English translation.

(Continued)

*Primary Examiner* — Kwang-su Yang
(74) *Attorney, Agent, or Firm* — Juan Carlos A. Marquez; Marquez IP Law Office, PLLC

(57) ABSTRACT

The present invention discloses embodiments for an optical touch systems and methods. One embodiment of the present invention is directed to an optical touch system that includes at least two image sensors configured to detect a plurality of objects over a touch surface to generate a plurality of object images; a plurality of first light receiving elements, wherein the first light receiving elements are arranged on a side of the touch surface along a first direction and are configured to detect the objects; and a processing unit configured to calculate a plurality of candidate coordinate data, based on the object images, and select the coordinate data that represents coordinate data of the objects from the candidate coordinate data, based on detection data of the first light receiving elements.

14 Claims, 8 Drawing Sheets

(58) Field of Classification Search
USPC .................................................. 345/173, 175
See application file for complete search history.

(56) References Cited

U.S. PATENT DOCUMENTS

| | | |
|---|---|---|
| 2010/0149132 A1 | 6/2010 | Iwase et al. |
| 2010/0225616 A1 | 9/2010 | Kiyose |
| 2010/0328244 A1* | 12/2010 | Lin et al. .................. 345/173 |
| 2011/0025622 A1* | 2/2011 | Juni ............................ 345/173 |
| 2011/0084938 A1* | 4/2011 | Wang ................... G06F 3/0428 345/175 |
| 2011/0116105 A1 | 5/2011 | Zhu et al. |
| 2012/0002217 A1* | 1/2012 | Kobayashi ............ G06F 3/0428 356/622 |
| 2012/0075253 A1* | 3/2012 | Tsai et al. ................... 345/175 |
| 2012/0105379 A1* | 5/2012 | Oishi et al. .................. 345/175 |
| 2012/0127129 A1* | 5/2012 | Su ......................... G06F 3/0428 345/175 |
| 2013/0082982 A1* | 4/2013 | Kosegawa ............ G06F 3/0421 345/175 |
| 2015/0277636 A1* | 10/2015 | Holmgren .......... G02B 19/0028 345/175 |

FOREIGN PATENT DOCUMENTS

| | | | |
|---|---|---|---|
| CN | 102033658 A | 4/2011 | |
| JP | WO 2011155466 A1 * | 12/2011 | ........... G06F 3/0428 |
| TW | 200928917 A | 12/1996 | |
| TW | 201101155 A1 | 1/2011 | |
| TW | 201218043 A1 | 5/2012 | |

OTHER PUBLICATIONS

Office Action from State Intellectual Property Office of the P.R.C. in the corresponding Chinese application 20120294864.X dated Mar. 4, 2016, 1 pp., with partial English translation.

* cited by examiner

OPTICAL TOUCH SYSTEM AND METHOD HAVING IMAGE SENSORS TO DETECT OBJECTS OVER A TOUCH SURFACE

CROSS-REFERENCE TO RELATED APPLICATION

The present application is based on, and claims priority from, Taiwan Patent Application. Serial Number 101113551, filed on Apr. 17, 2012, the disclosure of which is hereby incorporated by reference herein in its entirety.

BACKGROUND OF THE INVENTION

1. Field of the Invention

The present invention relates to an optical touch system and method.

2. Description of the Related Art

FIG. 1 illustrates a prior art infrared touch-sensing system 1. As shown in FIG. 1, the prior art infrared touch-sensing system 1 includes a touch surface 10, a plurality of X-axial infrared-emitting elements 122, a plurality of X-axial infrared-receiving elements 132, a plurality of Y-axial infrared-emitting elements 142 and a plurality of Y-axial infrared-receiving elements 152. The X-axial infrared-emitting elements 122 are in one-to-one correspondence with the X-axial infrared-receiving elements 132, and the Y-axial infrared-emitting elements 142 are in one-to-one correspondence with the Y-axial infrared-receiving elements 152, thereby forming sensing paths (as illustrated in dashed lines) that cross each other. In this way, a sensing grid is formed over the touch surface 11. When an object $O_1$ approaches the touch surface 11, the object $O_1$ blocks a sensing path in the sensing grid, which corresponds to a position $x_4$ on the X-axis and a sensing path in the sensing grid, which corresponds to a position $y_5$ on the Y-axis. Therefore, the X-axial infrared-receiving element 132 at the position $x_4$ receives infrared with less intensity $I_x$ in comparison to the X-axial infrared-receiving element 132 whose corresponding sensing paths are not blocked. Similarly, the Y-axial infrared-receiving element 152 at the position $y_5$ receives infrared with less intensity $I_y$ in comparison to the Y-axial infrared-receiving elements 152 whose corresponding sensing paths are not blocked. Because the intensities of infrared received by the infrared-receiving element 132 corresponding to the position $x_4$ and the infrared-receiving element 152 corresponding to the position $y_5$ are significantly lower, it can be derived that a touch position of the object $O_1$ is located at the position $(x_4, y_5)$.

However, the prior art infrared touch-sensing system 1 requires that the infrared-emitting elements 122 or 142 should be in one-to-one correspondence with the infrared-receiving elements 132 or 152, and that is the infrared-emitting elements 122 or 142 should be a narrow beam light source instead of a regular scattering light source so that the infrared-receiving elements 132 or 152 will only receive the light beams emitted by the corresponding infrared-emitting elements 122 or 142. Otherwise, the blocked sensing path cannot be accurately determined. However, it is difficult to confine the light beam emitted by an infrared-emitting element 122 or 142 to be received only by a single infrared-receiving element 132 or 152. Hence, an infrared-receiving element 122 or 142 of which the sensing path is blocked may receive infrared emitted from neighboring infrared-emitting elements 132 or 152, causing the output coordinate to be inaccurate. In addition, the situation is compounded with an object $O_2$ being located between positions $x_2$ and $x_3$ because the sensing paths corresponding to positions $x_2$ and $x_3$ are not completely blocked. With sensing paths that are not completely blocked, the position of the object will be more difficult to accurately determine. To reduce the above-mentioned negative effects, the prior art infrared touch-sensing system 1 mostly adopts a scanning method that enables the infrared-emitting elements 122 and 142 in sequence, so as to reduce interference. Nevertheless, this method still requires a narrow beam light source and may result in a longer touch-sensing response time. Moreover, in multi-touch applications, when there are a plurality of objects $O_1$ and $O_2$ approaching the touch surface 11 simultaneously, the prior art infrared touch-sensing system 1 cannot differentiate whether the touch positions of the object $O_1$ and the object $O_2$ are $(x_4, y_5)$ and $(x_2+\Delta x, y_2)$, or $(x_2+\Delta x, y_5)$ and $(x_4, y_2)$.

Therefore, it is desirable that an optical touch system and method can more accurately and easily determine touch positions of a plurality of objects.

SUMMARY OF THE INVENTION

The present invention is directed to an optical touch system and method that use image sensors to obtain candidate coordinate data of a plurality of objects over a touch surface and then employ a light receiving unit arranged along a side of the touch surface to assist in selecting coordinate data of the objects from the candidate coordinate data, thereby achieving more accurate positioning of touch positions of the plurality of objects using a scattering light source instead of a narrow beam light source.

According to an embodiment, the optical touch system includes at least two image sensors, a plurality of first light-receiving elements and a processing unit. The at least two image sensors are configured to detect a plurality of objects over a touch surface to generate a plurality of object images. The plurality of first light-receiving elements are arranged on a side of the touch surface along a first direction, and are configured to detect the objects. The processing unit is configured to calculate a plurality of candidate coordinate data, based on the object images, and select coordinate data that represents coordinate data of the objects from the plurality of candidate coordinate data, based on detection data of the first light-receiving elements.

According to an embodiment, the optical touch system includes a reflective element, at least one image sensor, a plurality of first light-receiving elements and a processing unit. The reflective element is configured to generate a plurality of virtual objects from a plurality of objects over the touch surface, wherein the reflective element is configured on a side of the touch surface along a second direction. The at least one image sensor is configured to detect a plurality of objects and the plurality of virtual objects to generate a plurality of object images and a plurality of virtual object images. The plurality of light-receiving elements are arranged on a side of the touch surface along a first direction, and are configured to detect the objects, wherein the first direction and the second direction intersect each other. The processing unit is configured to calculate a plurality of candidate coordinate data, based on the object images and the virtual object images, and select coordinate data that represents coordinate data of the objects from the plurality of candidate coordinate data, based on detection data of the light-receiving elements.

According to an embodiment, the light receiving method includes the following steps: receiving a plurality of first images and a plurality second images generated by at least one image sensor; calculating a plurality of candidate coordinate data of a plurality of objects over a touch surface, based on the first images and the second images; receiving detection data of a plurality of first light-receiving elements configured to detect the objects, wherein the first light-receiving elements correspond to different coordinate data along a first direction, respectively; and selecting coordinate data that represents coordinate data of the objects from the plurality of candidate coordinate data, based on detection data.

BRIEF DESCRIPTION OF THE DRAWINGS

The objectives and advantages of the present invention are illustrated with the following description and upon reference to the accompanying drawings in which.

DETAILED DESCRIPTION OF THE INVENTION

Figure 1:
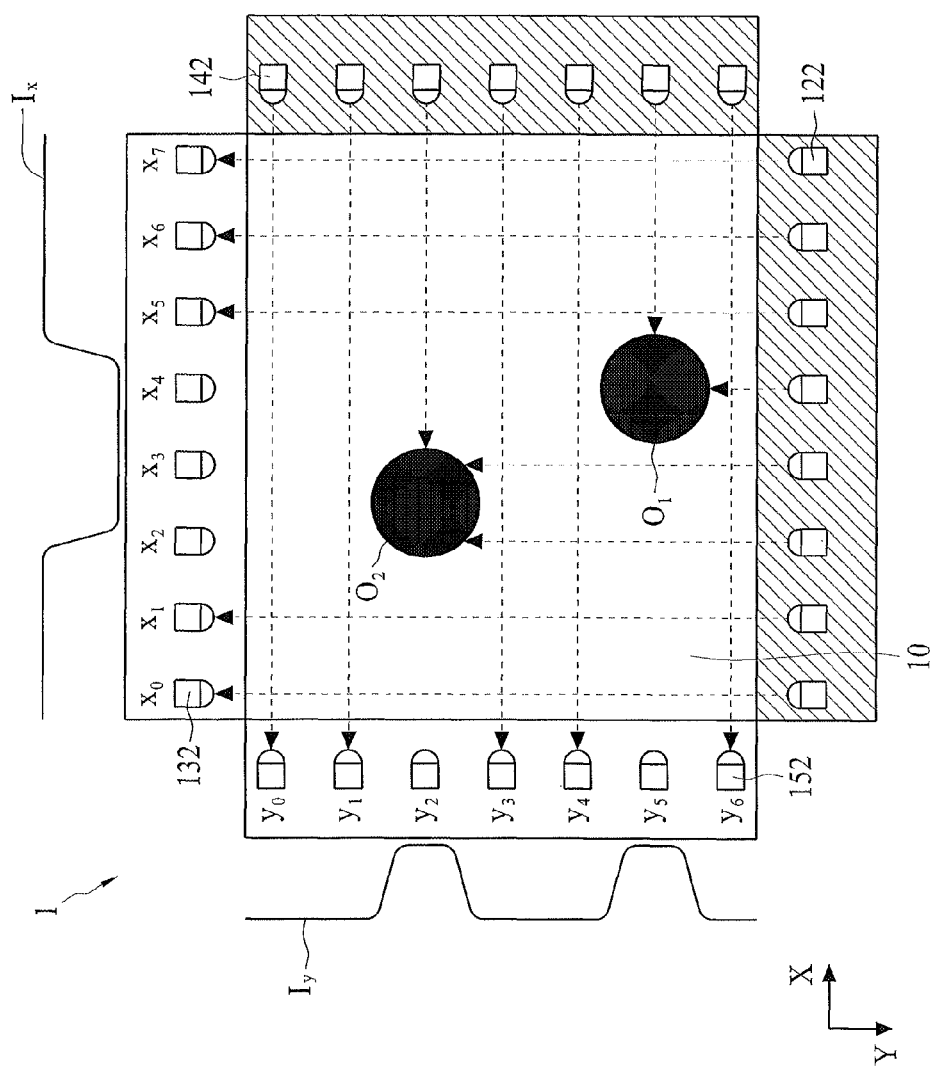
FIG. 1 illustrates a prior art infrared touch-system.
Figure 2:
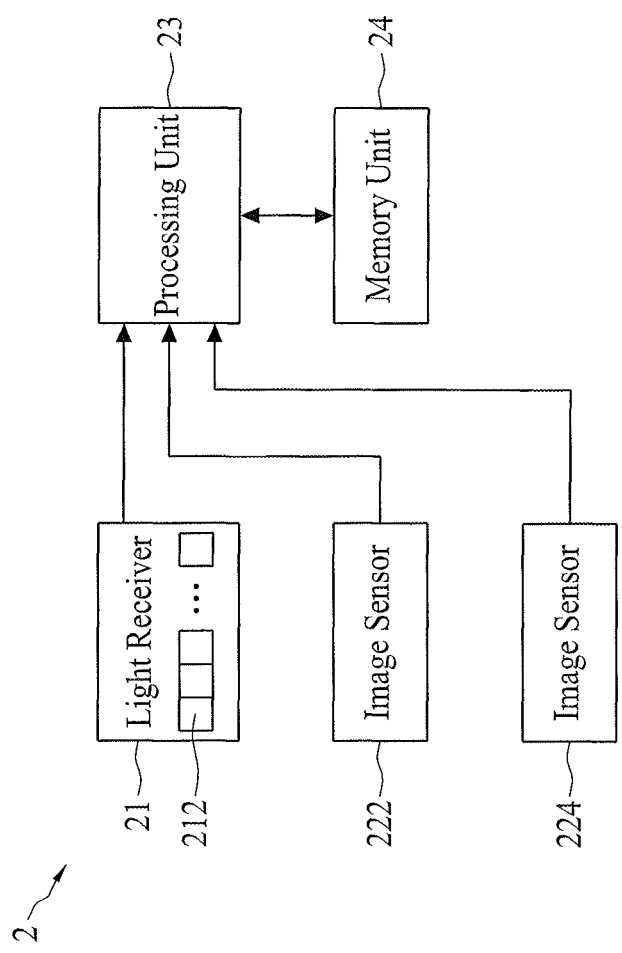
FIG. 2 is a block diagram of an optical touch system according to an embodiment of the present invention.
Figure 3:
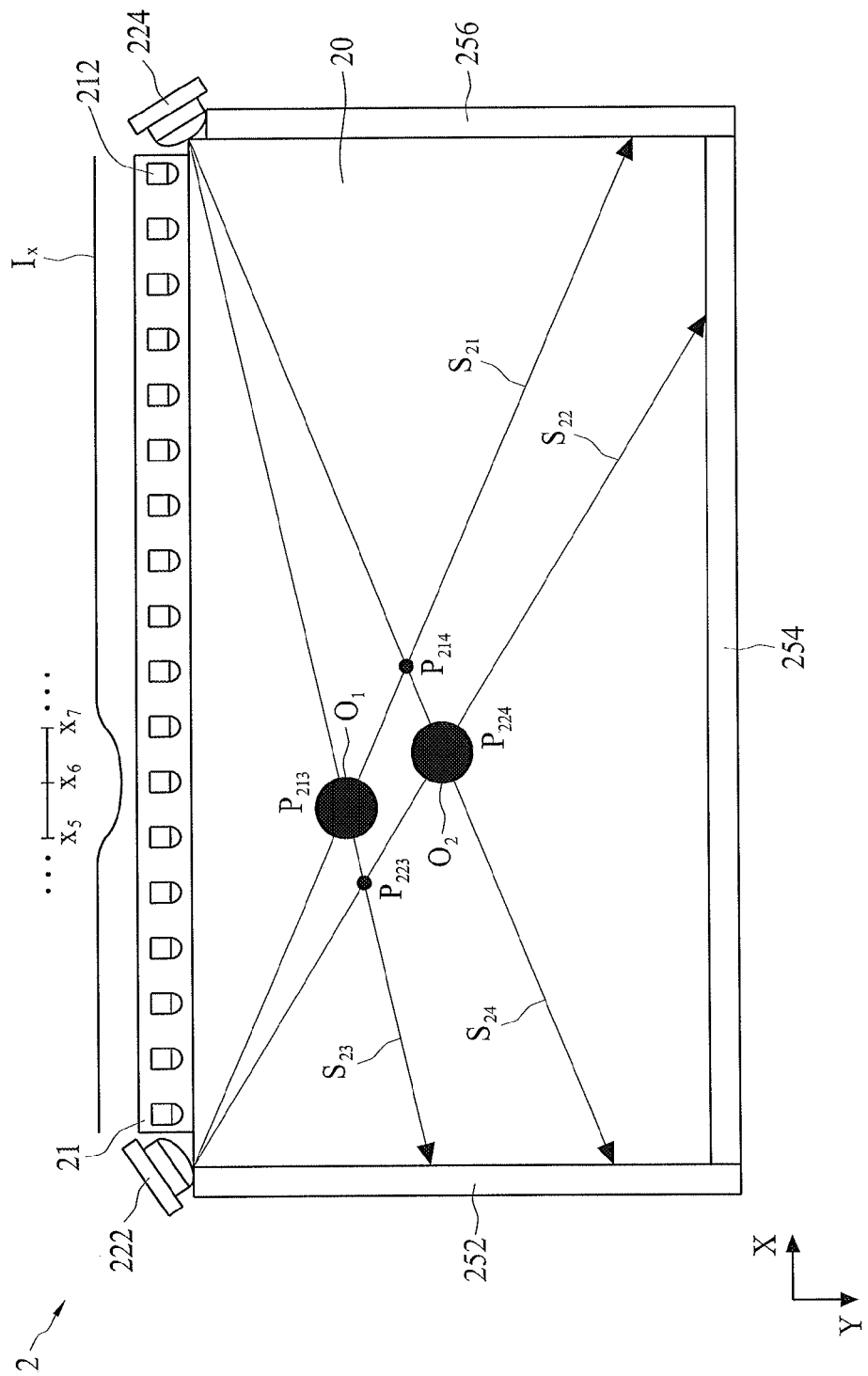
FIG. 3 is a schematic diagram illustrating an optical touch system according to an embodiment of the present invention.

FIG. 2 is a schematic block diagram illustrating an optical touch system 2 according to an embodiment of the present invention. FIG. 3 is a schematic diagram illustrating the optical touch system 2 according to an embodiment of the present invention. Referring to both FIG. 2 and FIG. 3, according to an embodiment, the optical touch system 2 comprises a touch surface 20, at least two image sensors 222 and 224, a light receiver 21 and a processing unit 23, wherein the light receiver 21 includes a plurality of first light-receiving elements 212. In the present embodiment, the first light-receiving elements 212 are X-axial light-receiving elements. According to an embodiment, the optical touch system 2 further includes at least one light-emitting device 252, 254 or 256 configured to illuminate at least one object touching the touch surface 20, providing light to allow the image sensors 222 and 224 to perform a detection operation. According to an embodiment, each of the light-emitting devices 252, 254 and 256 includes a light-emitting element and a light guide. The light-emitting element can be disposed on a side of the light guide to provide light for the light guide. The light propagates inside the light guide and is emitted toward the touch surface 20 from the light guide. The light-emitting element and the light guide may form a linear light source. According to an embodiment, the light-emitting element includes a light bulb, a light-emitting diode, or the like. According to a different embodiment, one of the light-emitting devices 252 and 256 includes a retro-reflector configured to reflect light. According to an embodiment, at least one of the light-emitting devices 252, 254 and 256 includes a plurality of light-emitting elements. The plurality of light-emitting elements are arranged on a side of the touch surface 20, wherein the light-emitting element includes a light bulb, a light-emitting diode, or the like.

Continuing the above description, the two image sensors 222 and 224 are configured to detect a plurality of objects $O_1$ and $O_2$ on the touch surface 20, and generate pictures that comprise a plurality of object images, respectively. Through analyzing the picture generated by the image sensor 222, the processing unit 23 can determine sensing paths $S_{21}$ and $S_{22}$ that are blocked by the objects $O_1$ and $O_2$, respectively; and through analyzing the picture generated by the image sensor 224, the processing unit 23 can determine sensing paths $S_{23}$ and $S_{24}$ that are blocked by the objects $O_1$ and $O_2$, respectively. When the processing element 23 calculates the intersecting points of the sensing paths of the two image sensors 222 and 224 to obtain coordinate data of the two objects, it will obtain four samples of candidate coordinate data $P_{213}$, $P_{214}$, $P_{223}$ and $P_{224}$ that are at the intersections of the sensing paths $S_{21}$, $S_{22}$, $S_{23}$ and $S_{24}$. The four samples of candidate coordinate data $P_{213}$, $P_{214}$, $P_{223}$ and $P_{224}$ include actual touch positions of the objects $O_1$ and $O_2$ (the candidate coordinate data $P_{213}$ and $P_{224}$) and ghost touch positions (the candidate coordinate data $P_{214}$ and $P_{223}$). With respect to the calculation of the aforementioned touch-sensing paths and candidate coordinate data, U.S. patent application Ser. No. 13/302,481 can be used as a source of reference, and is incorporated herein by reference.

Continuing the above description, the first light receiving elements 212 are arranged on a side of the touch surface 20 along an X-axial direction, and configured to detect the objects $O_1$ and $O_2$. According to an embodiment, one of the light-emitting devices 254 is disposed opposite to the first light-receiving elements 212 to provide light for a detection operation. Preferably, the first light-receiving elements 212 are primarily used to obtain a distribution or location information of the objects $O_1$ and $O_2$ along the X-axial direction for determining which of the candidate coordinate data $P_{213}$, $P_{214}$, $P_{223}$ and $P_{224}$ are the actual touch positions. Because the first light-receiving elements 212 are not used to accurately calculate the coordinate data of the objects $O_1$ and $O_2$, the light-emitting devices 252, 254 and 256 do not need to emit narrow beams, but they may be scattering light sources. According to an embodiment, it is preferred that the first light-receiving elements 212 are primarily used to obtain a one-dimensional signal distribution or location information of the objects $O_1$ and $O_2$ along the X-axial direction.

Referring to FIG. 3, in this embodiment, the objects $O_1$ and $O_2$ block a portion of the light that travels toward the first light-receiving elements 212 corresponding to the X-axial positions $x_5$, $x_6$ and $x_7$, causing the intensity $I_x$ of the light received by the first light-receiving elements 212 at positions $x_5$ to $x_7$ to be lower. Light that travels toward the first light-receiving elements 212 at position $x_6$ is blocked more by the objects $O_1$ and $O_2$ than the light travelling toward the first light-receiving elements 212 at positions $x_5$ and $x_7$; therefore the first light-receiving elements 212 at position $x_6$ receives light with lower intensity. The light receiving element 212 can be any device that generates a signal whose strength will be changed in response to the intensity of the received light, wherein the signal can be a voltage, a current or the amount of electrons. According to an embodiment, the first light-receiving element 212 is a photo-transistor or a photo-diode configured to convert received light into a current or a voltage, according to its intensity.

According to an embodiment, the light receiver 21 may further include a circuit, which can generate a one-dimensional signal distribution extending along the X-axial direction, based on the electric signals generated by the first light-receiving elements 212, to serve as detection data, which is then transmitted to the processing units 23. According to a different embodiment, based on the electric signals generated by the first light-receiving elements 212, the optical touch system 2 may further determine the first light-receiving elements 212 located at positions $x_5$ to $x_7$ to be the detection data, and the detection data is then transmitted to the processing unit 23. According to an embodiment, the processing unit 23 determines the first light-receiving elements 212 that detect the objects $O_1$ and $O_2$, based on the electric signals. According to an embodiment, because the electric signals generated by the first light-receiving elements 212 at positions $x_5$ and $x_7$ are higher than the electrical signal generated by the first light-receiving element 212 at position $x_6$, it can be determined that the objects $O_1$ and $O_2$ are located between positions $x_5$ and $x_7$ in the X-axial direction.

Continuing the above description, from the plurality of candidate coordinate data $P_{213}$, $P_{214}$, $P_{223}$ and $P_{224}$, the processing unit 23 selects coordinate data $P_{213}$ and $P_{224}$ that represents the objects $O_1$ and $O_2$, based on the detection data of the first light-receiving elements 212 transmitted by the light receiver 21. According to an embodiment, the detection data reflects location information or a distribution of the objects $O_1$ and $O_2$ in the X-axial direction. The processing unit 23 compares the candidate coordinate data $P_{213}$, $P_{214}$, $P_{223}$ and $P_{224}$ with the distribution to determine the actual touch positions (i.e. candidate coordinate data $P_{213}$ and $P_{224}$) of the objects $O_1$ and $O_2$. According to an embodiment, based on the detection data of the first light-receiving elements 212, the processing unit 23 obtains a first distribution width ($|x_7-x_5|$) of the objects $O_1$ and $O_2$. The processing unit 23 then calculates second distribution widths between any two of the candidate coordinate data $P_{213}$, $P_{214}$, $P_{223}$ and $P_{224}$, and compares the second distribution widths with the first distribution width to select the candidate coordinate data $P_{213}$ and $P_{224}$ with the second distribution width that is closest to the first distribution width as the coordinate data that represents the objects $O_1$ and $O_2$.

According to an embodiment, when there are two candidate coordinate data, and there are several consecutive first light-receiving elements 212 (as illustrated in FIG. 3) that detect objects $O_1$ and $O_2$, the first distribution width is the distance between the farthest two of the first light-receiving elements 212 that detect objects $O_1$ and $O_2$ (e.g. the first light-receiving elements 212 corresponds to positions $x_5$ and $x_7$).

According to another embodiment, when there are at least two groups of candidate coordinate data and there are at least two groups of first light-receiving elements 212 (e.g. the first group comprises the first light-receiving elements 212 corresponding to positions $x_5$ to $x_6$ and the second group comprises the first light-receiving elements 212 corresponding to positions $x_6$ to $x_7$) in the light receiver 21 that detect the objects $O_1$ and $O_2$. Then, a centroid/center of each group of the light receiving elements 212 will be calculated, and a distance between the two groups will be calculated using the centroids/centers to serve as the first distribution width.

According to still another embodiment, when there are at least two groups of candidate coordinate data, and there are at least two groups of first light-receiving elements 212 (e.g. the first light-receiving elements 212 corresponding to positions $x_5$ to $x_6$ and to positions $x_6$ to $x_7$) in the light-receiver 21 that detect objects $O_1$ and $O_2$, left borders or right borders of the two groups of the first light-receiving elements 212 are subtracted from each other, or a left border of the left group of first light-receiving elements 212 and a right border of the right group of the first light-receiving element 212 are subtracted from each other to obtain the first distribution width.

According to still another embodiment, when there are two groups of candidate coordinate data, and there are at least two groups of first light-receiving elements 212 (e.g. the first light-receiving elements 212 corresponding to positions $x_5$ to $x_6$ and to positions $x_6$ to $x_7$) in the light-receiver 21 that detect objects $O_1$ and $O_2$, and based on detection data of the first light-receiving elements 212, the processing unit 23 obtains approximate coordinate data, $x_5$ and $x_7$ in the X-axial direction in the present embodiment, of the objects $O_1$ and $O_2$. Then, from the candidate coordinate data $P_{213}$, $P_{214}$, $P_{223}$ and $P_{224}$, the processing unit 23 selects the candidate coordinate data $P_{213}$ and $P_{224}$ with coordinate data that are closest to the approximate coordinate data ($x_5$ and $x_7$) as the coordinate data that represents the objects $O_1$ and $O_2$.

In the foregoing embodiments, the first light-receiving elements 212 are not used to accurately determine the touch positions of the objects $O_1$ and $O_2$, but are used to help determine the actual touch positions from the candidate coordinate data $P_{213}$, $P_{214}$, $P_{223}$ and $P_{224}$ to be $P_{213}$ and $P_{224}$. Therefore, the need for narrow beam light sources to achieve one-to-one correspondence with the first light-receiving elements 212 is no longer required, and only an approximate distribution width in the X-axial direction or approximate X-axial coordinate data of the objects $O_1$ and $O_2$ are required to obtain accurate positions $P_{213}$ and $P_{224}$.

According to an embodiment, when the number of object images generated by the image sensor 222 and the number of object images generated by the image sensor 224 are the same, the processing unit 23 can group the candidate coordinate data. The number of candidate coordinate data in each group is equal to the number of object images, and the candidate coordinate data in a group represents points on different sensing paths corresponding to the image sensors 222 and 224. For example, $P_{213}$ and $P_{224}$ are located on different sensing paths $S_{21}$ and $S_{22}$ of the image sensor 222 and are located on different sensing paths $S_{23}$ and $S_{24}$ of the image sensor 224. Hence, $P_{213}$ and $P_{224}$ can be treated as a group, and similarly, $P_{214}$ and $P_{223}$ can be treated as a group. In contrast, $P_{213}$ and $P_{214}$ are located on the same sensing path $S_{21}$ of the image sensor 222, and therefore $P_{213}$ and $P_{214}$ will not form a group. According to an embodiment, the processing unit 23 can calculate a distribution width of each group of candidate coordinate data in the X-axial direction, and then compare each distribution width with the first distribution width (which is roughly $|x_7-x_5|$) obtained, based on the detection data, to determine the actual touch position. According to another embodiment, the processing unit 23 may obtain coordinate data of the farthest two of the candidate coordinate data in the X-axial direction, and then compare the coordinate data with the coordinate data $x_5$ and $x_7$ obtained, based on the detection data, to determine the actual touch position. The embodiments where the light-receiving elements 212 are arranged along the X-axial direction should be considered as examples. The present invention is not limited to be implemented in this manner. The first light-receiving elements 212 may also be arranged along a non X-axial direction, such as the Y-axial direction.

According to an embodiment, the optical touch system 2 further includes a memory unit 24, configured to store a program to be executed by the processor or to store data required for the processing unit 23 to execute the program, such as the generated pictures of the image sensors 222 and 224 received, and the one-dimensional signal distribution generated by the light-receiving elements 212.

Figure 4:
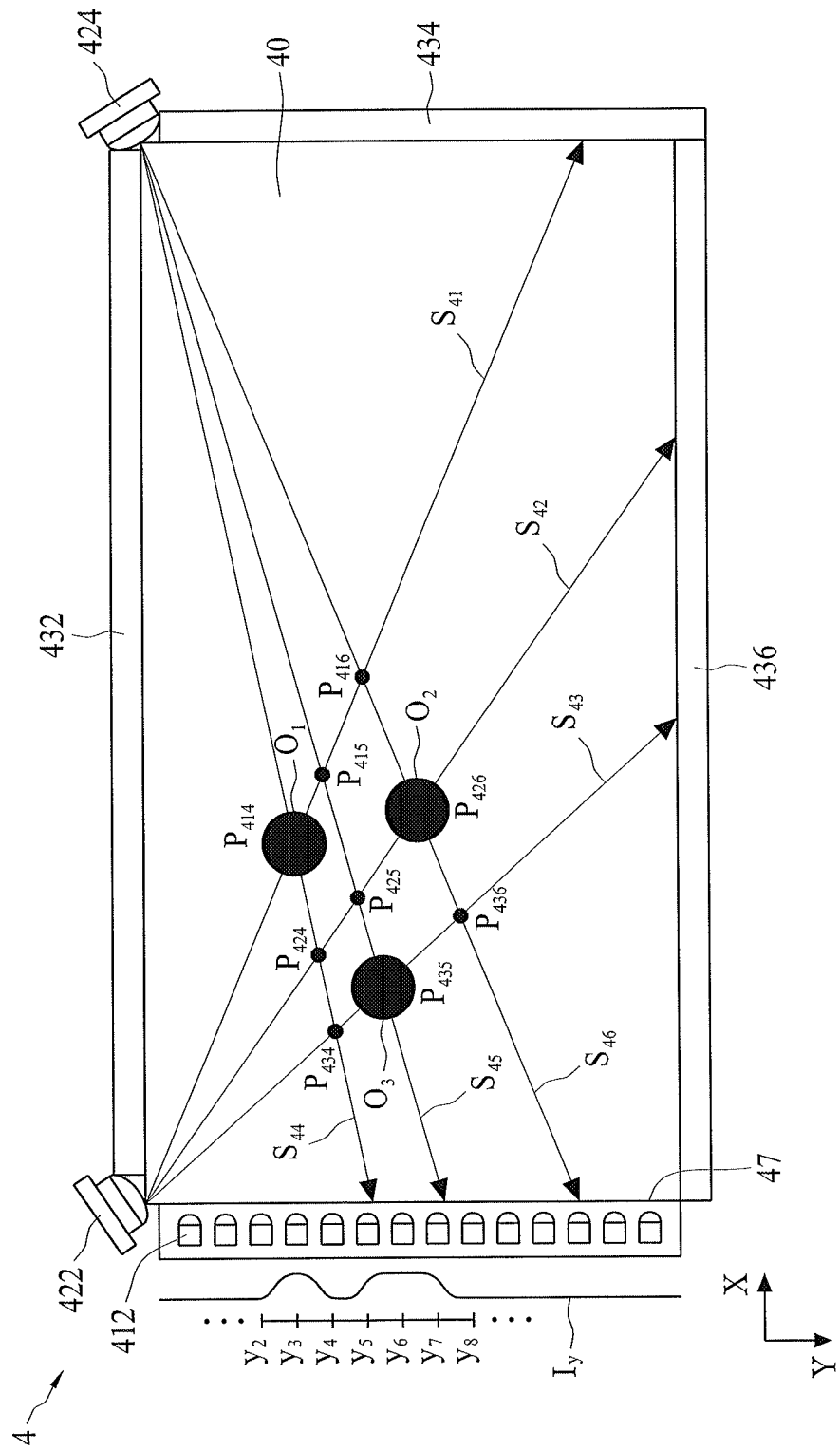
FIG. 4 is a schematic diagram illustrating an optical touch system according to an embodiment of the present invention.

FIG. 4 is a schematic diagram illustrating an optical touch system 4 according to an embodiment of the present invention. As illustrated in FIG. 4, the optical touch system 4 includes a touch surface 40, at least two image sensors 422 and 424, a plurality of Y-axial light-receiving elements 412 and a processing unit (not illustrated). According to an embodiment, the optical touch system 4 further includes at least one light-emitting device 432, 434 or 436. According to an embodiment, the two image sensors 422 and 424 are configured to detect a plurality of objects $O_1$, $O_2$ and $O_3$ on the touch surface 40, and generate pictures, each comprising a plurality of object images, respectively. Through analyzing the pictures generated by the image sensors 422 and 424, the processing unit can determine sensing paths $S_{41}$, $S_{42}$ and $S_{43}$ that are blocked by the objects $O_1$, $O_2$ and $O_3$, respectively, and sensing paths $S_{44}$, $S_{45}$ and $S_{46}$ that are blocked by the objects $O_1$, $O_2$ and $O_3$, respectively, and obtains nine samples of candidate coordinate data $P_{414}$, $P_{415}$, $P_{416}$, $P_{424}$, $P_{425}$, $P_{426}$, $P_{434}$, $P_{435}$ and $P_{436}$ by calculating intersecting points of the sensing paths $S_{41}$, $S_{42}$ and $S_{43}$ and the sensing paths $S_{44}$, $S_{45}$ and $S_{46}$. According to the present embodiment, the Y-axial light-receiving elements 412, arranged on a side of the touch surface 40, are configured to detect the objects $O_1$, $O_2$ and $O_3$.

Particularly, the objects $O_1$, $O_2$ and $O_3$ block a portion of the light that travels toward the Y-axial light-receiving elements 412, causing an intensity $I_y$ of light transmitted to the Y-axial light-receiving elements 412 to be lower at position $y_3$ and positions $y_5$ to $y_7$. Therefore, a one-dimensional signal distribution along the Y-axial direction generated by the Y-axial light-receiving elements 412 is lower at position $y_3$ and positions $y_5$ to $y_7$.

According to an embodiment, based on detection data of the Y-axial light-receiving elements 412, the processing unit obtains a largest distribution width ($|y_7-y_3|$) of the objects $O_1$, $O_2$ and $O_3$ along the Y-axial direction. According to an embodiment, because the objects $O_1$, $O_2$ and $O_3$ are located on different sensing paths of the image sensors 422 and 424, the processing unit treats $P_{414}$, $P_{425}$, $P_{436}$ as a first group, $P_{414}$, $P_{426}$, $P_{435}$ as a second group, $P_{415}$, $P_{424}$, $P_{436}$ as a third group, $P_{415}$, $P_{426}$, $P_{434}$ as a fourth group, $P_{416}$, $P_{424}$, $P_{435}$ as a fifth group, and $P_{416}$, $P_{425}$, $P_{434}$ as a sixth group when performing a comparison with the largest distribution width. During the comparison, the first group of which a distribution width is larger than $|y_7-y_3|$, and the fourth, fifth and sixth groups of which distribution widths are smaller than $|y_7-y_3|$ are eliminated. The processing unit further compares which of the second and third groups of the candidate coordinate data are closer to the coordinate data $y_3$ and $y_7$ in the Y-axial direction obtained, based on detection data, and then selects the second group that is the closest. In the aforementioned embodiment, the largest distribution width is first compared, and then the coordinate data is compared. Alternatively, the coordinate data may be directly compared.

The light-receiving elements 412 can be configured on the side of the touch surface 40 that is opposite to one of the at least two image sensors 422 and 424 and adjacent to the other of the at least two image sensors 422 and 424. In the present embodiment, the plurality of Y-axial light-receiving elements 412 are configured on the side 47 of the touch surface 40 that is opposite to one of the at least two image sensors 422 and 424 and adjacent to the other of the at least two image sensors 422 and 424. In this embodiment, the Y-axial light-receiving elements 412 that are closer to the image sensors 422 or 424 are less densely spaced than those that are farther from the image sensors 422 or 424.

Figure 5:
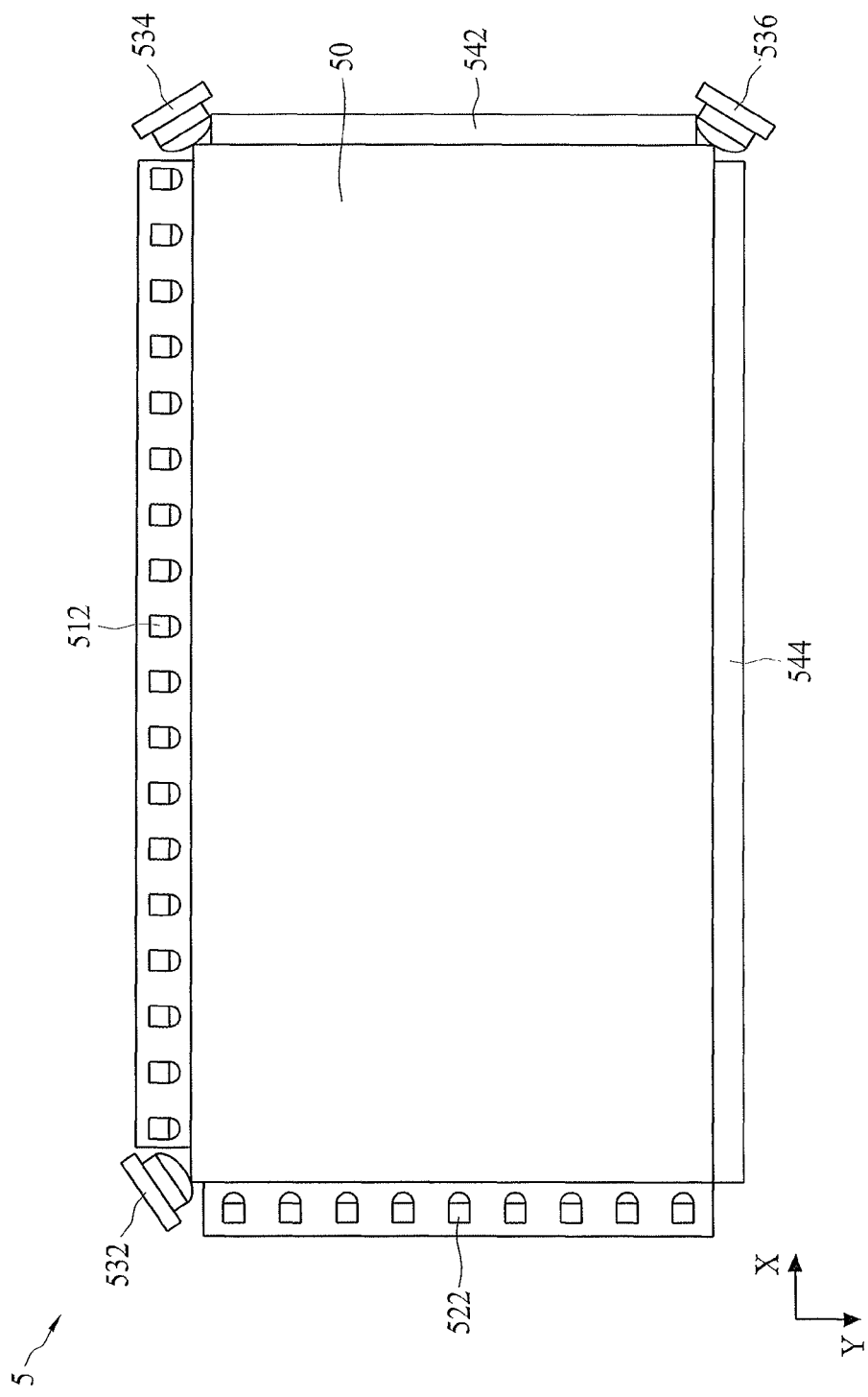
FIG. 5 is a schematic diagram illustrating an optical touch system according to an embodiment of the present invention.

FIG. 5 is a schematic diagram illustrating an optical touch system 5 according to an embodiment of the present invention. As shown in FIG. 5, the optical touch system 5 includes a touch surface 50, at least three image sensors 532, 534 and 536 and a processing unit (not illustrated). According to an embodiment, the optical touch system 5 further includes at least two light-emitting devices 542 and 544.

According to an embodiment, the optical touch system 5 further includes a plurality of X-axial light-receiving elements 512. The processing unit uses the image sensors 532, 534 and 536 to generate candidate coordinate data of the objects on the touch surface 50, obtains an approximate X-axial distribution width or X-axial coordinate data through X-axial light receiving elements 512, and then selects the coordinate data that represent the objects from the candidate coordinate data, based on the approximate X-axial distribution or X-axial coordinate data of the objects.

According to an embodiment, the optical touch system 5 further includes a plurality of Y-axial light-receiving elements 522. The processing unit uses the image sensors 532, 534 and 536 to generate candidate coordinate data of the objects on the touch surface 50, obtains an approximate Y-axial distribution or approximate Y-axial coordinate data through Y-axial light receiving elements 522, and then selects the coordinate data that represents the objects from the candidate coordinate is data, based on the approximate Y-axial distribution or Y-axial coordinate data of the objects.

According to an embodiment, the optical touch system 5 includes a plurality of X-axial light-receiving elements 512, a plurality Y-axial light-receiving elements 522, and the processing unit can use detection data of the X-axial light receiving elements 512 and detection data of the Y-axial light receiving elements 522 to obtain an approximate X-axial distribution width or approximate X-axial coordinate data, and an approximate Y-axial distribution width or approximate Y-axial coordinate data for selecting the coordinate data that represents the objects from the candidate coordinate data.

Figure 6:
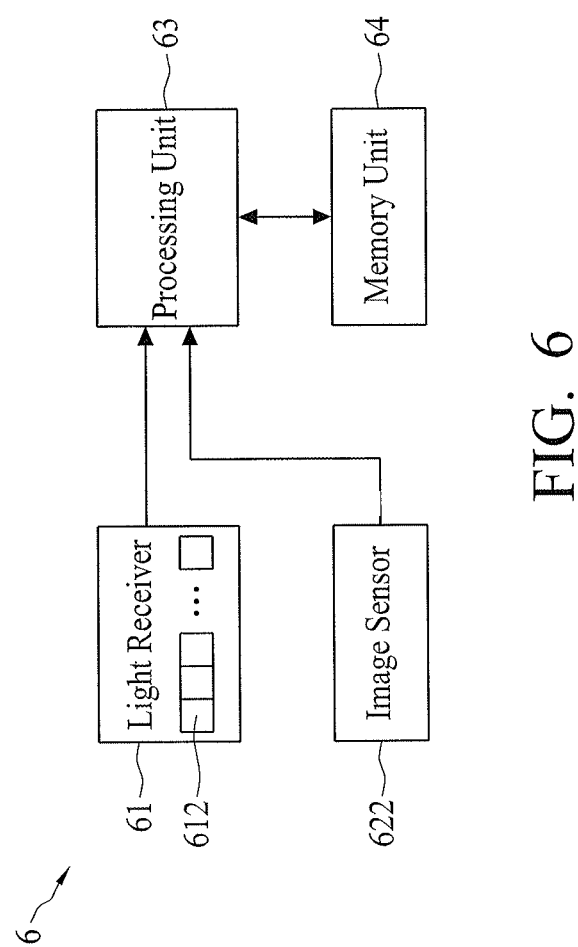
FIG. 6 is a block diagram of an optical touch system according to an embodiment of the present invention.
Figure 7:
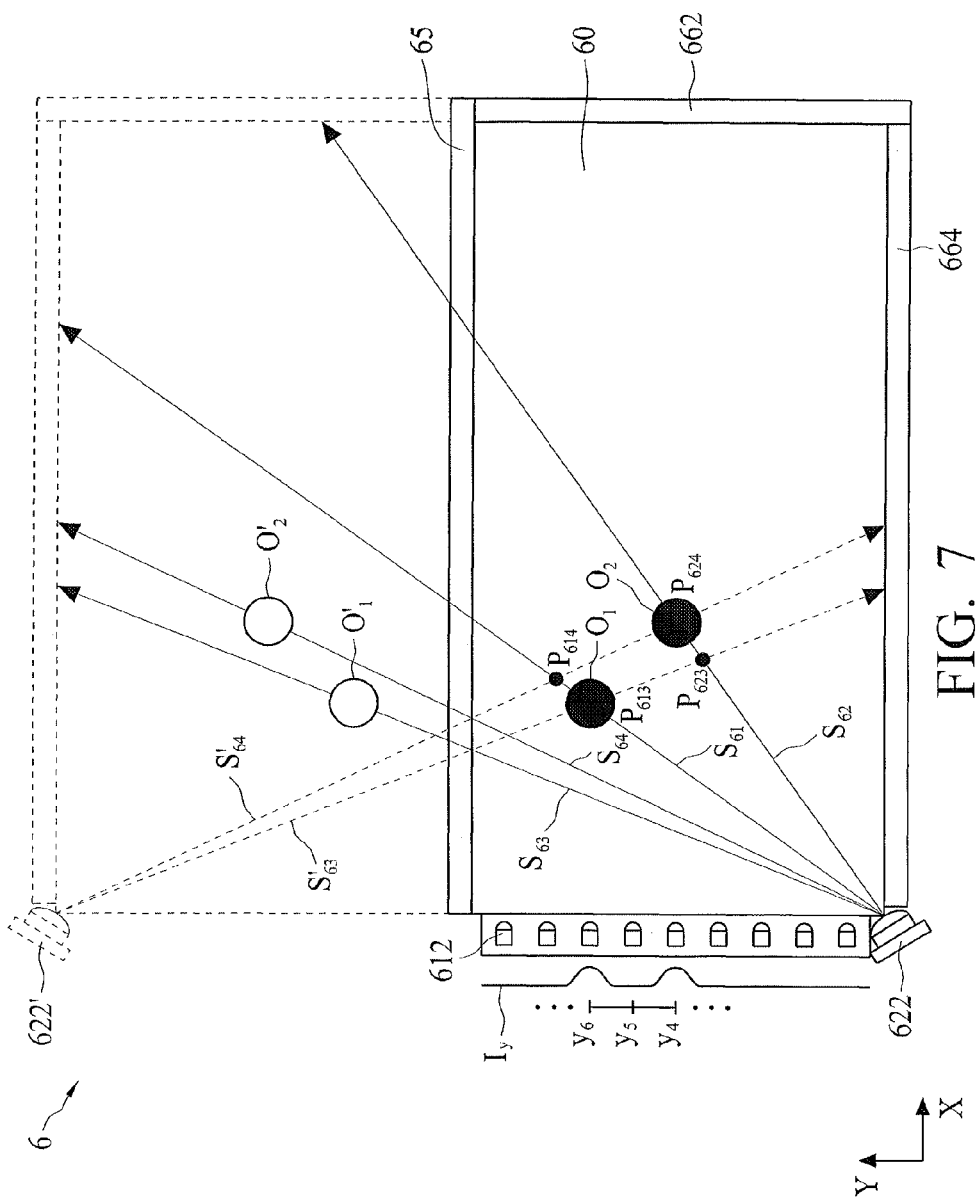
FIG. 7 is a schematic diagram illustrating an optical touch system according to an embodiment of the present invention.

FIG. 6 is a schematic block diagram illustrating an optical touch system 6 according to an embodiment of the present invention. FIG. 7 is a schematic diagram illustrating the optical touch system 6 according to an embodiment of the present invention. Referring to both FIG. 6 and FIG. 7, according to an embodiment, the optical touch system 6 comprises a touch surface 60, at least one image sensor 622, a light receiver 61, a processing unit 63, and a reflective element 65, wherein the light receiver 61 includes a plurality of Y-axial light-receiving elements 612. According to an embodiment, the optical touch system 6 further includes light-emitting devices 662 and 664, which are configured to illuminate objects touching the touch surface 60 and to provide light to allow the image sensors 622 to perform a detection operation.

Continuing the above description, the reflective element 65, arranged on a side of the touch surface 60, is configured to generate a plurality of virtual objects $O_1'$ and $O_2'$ from a plurality of objects $O_1$ and $O_2$ on the touch surface 60. The image sensor 622 is configured to detect the objects $O_1$ and $O_2$ and the virtual objects $O_1'$ and $O_2'$ to generate a picture that may comprise a plurality of object images and a plurality of virtual object images. Through analyzing the picture generated by the image sensor 622, the processing unit 63 can determine sensing paths $S_{61}$ and $S_{62}$ that are blocked by the objects $O_1$ and $O_2$, respectively, and sensing paths $S_{63}$ and $S_{64}$ which seem to be blocked by the objects $O_1'$ and $O_2'$, respectively. The sensing paths $S_{63}$ and $S_{64}$ can be viewed as virtual sensing paths $S_{63}'$ and $S_{64}'$ that are generated by a virtual image sensor 622' and are blocked by the objects $O_1$ and $O_2$. In this way, the present embodiment can be considered to be the same as the above-mentioned embodiment with two image sensors. Therefore, by calculating intersecting points of the sensing paths $S_{61}$ and $S_{62}$ and sensing paths $S_{63}'$ and $S_{64}'$, candidate coordinate data $P_{613}$, $P_{614}$, $P_{623}$ and $P_{624}$ can be obtained. According to the intensity $I_y$ of light transmitted to the Y-axial light receiving elements 612, the Y-axial light receiving elements 612 will generate a one-dimensional signal distribution. Based on the one-dimensional signal distribution generated by the Y-axial light receiving elements 612, the processing unit obtains a distribution width ($|y_6-y_4|$) of the objects $O_1$ and $O_2$ in the Y-axial direction, or coordinate data ($y_6$ and $y_4$) of the objects $O_1$ and $O_2$ in the Y-axial direction, whereby the processing unit selects coordinate data at $P_{613}$ and $P_{624}$ to be coordinate data of the objects to $O_1$ and $O_2$. According to a different embodiment, three objects may also be detected and/or the number of image sensors may also be increased. Details for these embodiments have been provided above and are omitted herein.

According to an embodiment, the optical touch system 6 further includes a memory unit 64, configured to store a program to be executed by the processor or to store data required for the processing unit 63 to execute the program, such as the generated pictures of the image sensor 622 received and the one-dimensional signal distribution generated by the light-receiving elements 612.

In the foregoing embodiment, the light receiving elements that have detected objects will generate signals that are lower than other light receiving elements. However, the present invention is not limited to be implemented in this manner. The light receiving elements may be designed to receive light reflected from the objects; and therefore, the light receiving elements that have detected the objects will generate signals that are higher than other light receiving elements.

Figure 8:
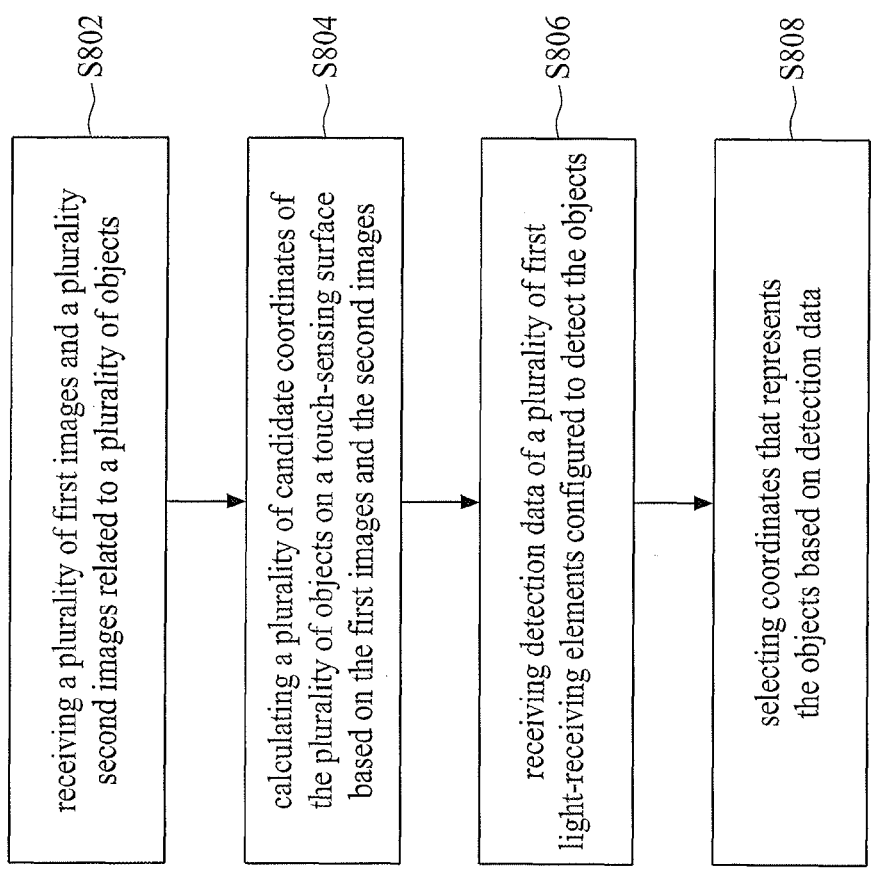
FIG. 8 is a flow chart illustrating an optical touch method according to an embodiment of the present invention.

FIG. 8 is a flow chart illustrating an optical touch-sensing method according to an embodiment of the present invention. The optical touch-sensing method of the present embodiment can be executed by the processing unit 23 or 63 of the optical touch system illustrated in FIG. 2 or FIG. 6, and can be stored in the memory unit 24 or 64 shown in FIG. 2 or FIG. 6. As illustrated in FIG. 8, the optical touch-sensing method includes the following steps. In step S802, a plurality of first images and a plurality of second images generated by at least one image sensor and related to a plurality of objects are received. The first images and the second images can be a plurality of object images generated by two image sensors, respectively, or the first images and the second images are a plurality of object images and a plurality of virtual object images produced by one image sensor, respectively, as described in the foregoing optical touch system embodiments. Then in step S804, a plurality of candidate coordinate data of the plurality of objects on a touch surface is calculated based on the first images and the second images. Then in step S806, detection data of a plurality of first light-receiving elements configured to detect the objects is received. According to an embodiment, the first light-receiving elements correspond to different coordinate data along a first direction, respectively. According to an embodiment, the detection data include a one-dimensional signal distribution along a first direction generated by the first light-receiving elements. According to another embodiment, the detection data comprise identity information of the first light-receiving elements that have detected the objects. Then in step S808, coordinate data that represents coordinate data of the objects from the plurality of candidate coordinate data is selected, based on detection data.

According to an embodiment, step S808 includes obtaining a first distribution width, based on the detection data of the first light-receiving elements, and selects the coordinate data that represents the coordinate data of the objects, based on the first distribution width. According to an embodiment, the candidate coordinate data includes a plurality of groups of candidate coordinate data, and for each group of candidate coordinate data, a second distribution width is calculated, and compared with the first distribution width. According to an embodiment, the first distribution width is a distance between the farthest two of the first light-receiving elements that have detected the objects.

According to a different embodiment, step S808 includes determining coordinate data of the objects in the first direction, based on the detection data, and selecting coordinate data that represent the coordinate data of the objects.

To summarize the foregoing embodiments, the optical touch system and method of the present invention use image sensors to obtain candidate coordinate data of a plurality of objects over a touch surface and then employ a light receiving unit arranged along a side of the touch surface to assist in selecting coordinate data of the objects from the candidate coordinate data, thereby achieving more accurate positioning of touch positions of the plurality of objects using a scattering light source instead of a narrow beam light source.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An optical touch system, comprising:
   a plurality of first light detectors, arranged on a side of a touch surface along a first direction and configured to detect a plurality of objects on the touch surface, wherein at least two of the first light detectors detect the plurality of objects;
   at least two image sensors, configured to detect the plurality of objects to generate a plurality of object images; and
   a processor, configured to calculate a plurality of candidate coordinate data, based on the object images, to group the plurality of candidate coordinate data into two groups, and to select one group of coordinate data representing the objects from the two groups of candidate coordinate data, based on positions of the at least two of the first light detectors detecting the plurality of objects, wherein
   the processor is further configured to obtain a first distribution width, based on the detection data of the first light detectors, and to select the coordinate data representing the objects, based on the first distribution width, the first distribution width being a distance between the farthest two of the first light detectors that detect the objects, calculate a second distribution width of each group of candidate coordinate data, and compare the first distribution width with the second distribution width.

2. The optical touch system of claim 1, wherein the processor obtains coordinate data in the first direction, based on the detection data of the first light detectors, and selects the coordinate data that represent the objects, based on the coordinate data.

3. The optical touch system of claim 1, wherein when the processor performs selection, the processor is configured to group the candidate coordinate data, wherein the number of candidate coordinate data in each group is equal to the number of object images generated by the image sensor, and all of the candidate coordinate data in any group of candidate coordinate data correspond to different sensing paths of the image sensors.

4. The optical touch system of claim 1, wherein a first light detector that detects the objects generates a signal that is smaller than a signal generated by a first light detector that does not detect the objects.

5. The optical touch system of claim 1, further comprising a plurality of second light detectors, wherein the second light detectors are arranged on a side of the touch surface along a second direction, wherein the second direction extends transverse to the first direction, and the second light detectors are configured to detect the objects, and the processing unit further selects coordinate data that represents the objects from the plurality of candidate coordinate data, based on detection data of the second light detectors.

6. The optical touch system of claim 1, wherein the first light detectors are configured on the side of the touch surface that is opposite to one of the at least two image sensors and adjacent to the other of the at least two image sensors, wherein a portion of the first light detectors that are closer to the image sensors are less densely spaced than another portion of the first light detectors that are farther from the image sensors.

7. The optical touch system of claim 1, wherein each of the first light detectors comprises a photo-transistor.

8. The optical touch system of claim 1, further comprising a plurality of light-emitting devices configured to illuminate the objects.

9. The optical touch system of claim 8, wherein one of the light-emitting devices is disposed opposite to the first light detectors.

10. The optical touch system of claim 1, wherein the position of the at least two of the first light detectors detecting the plurality of objects represents at least two position values along the first direction of the touch surface, and the processor selects coordinate data having the same position values along the first direction with the at least two of the first light detectors detecting the plurality of objects.

11. An optical touch-sensing method, which comprises the steps of:
    receiving a plurality of first images and a plurality second images related to a plurality of objects from at least one image sensor;
    receiving detection data from a plurality of first light detectors configured to detect the objects and convert light received from the objects into electrical signals, wherein the first light detectors correspond to different coordinate data along a first direction, respectively;
    calculating a plurality of candidate coordinate data of the plurality of objects, based on the plurality of first and second images;
    grouping the plurality of candidate coordinate data into two groups; and
    selecting one group of candidate coordinate data that represents the plurality of objects from the two groups of candidate coordinate data, based on positions of the plurality of the first light detectors detecting the plurality of objects, wherein
    the step of selecting coordinate data that represents the objects comprises steps of:
    obtaining a first distribution width, based on the detection data of the first light detectors,
    selecting the coordinate data that represents the objects, based on the first distribution width, and the first distribution width is a distance between the farthest two of the first light detectors that detect the objects,
    calculating a second distribution width of each group of candidate coordinate data, and
    comparing the second distribution width with the first distribution width.

12. The optical touch-sensing method of claim 11, wherein the step of selecting coordinate data that represents the objects comprises of obtaining coordinate data of the objects along the first direction, based on the detection data, and selecting the coordinate data that represents the objects, based on the coordinate data.

13. The optical touch-sensing method of claim 11, wherein the first images and the second images are a plurality of object images generated by two image sensors, respectively, or the first images and the second images are a plurality of object images and a plurality of virtual object images produced by one image sensor, respectively.

14. The optical touch-sensing method of claim 11, wherein the positions of the plurality of the first light detectors detecting the plurality of objects represents a plurality of position values along the first direction of the touch surface, and the selected coordinate data having the same position values along the first direction with the plurality of the first light detectors detecting the plurality of objects.

\* \* \* \* \*